United States Patent
Spann

(10) Patent No.: US 12,358,332 B1
(45) Date of Patent: Jul. 15, 2025

(54) VERTICAL TAKEOFF AND LANDING PERSONAL LAND TO AIR VEHICLE

(71) Applicant: Makeeva Spann, Summerville, SC (US)

(72) Inventor: Makeeva Spann, Summerville, SC (US)

( * ) Notice: Subject to any disclaimer, the term of this patent is extended or adjusted under 35 U.S.C. 154(b) by 0 days.

(21) Appl. No.: 18/593,662

(22) Filed: Mar. 1, 2024

Related U.S. Application Data

(60) Provisional application No. 63/449,970, filed on Mar. 4, 2023.

(51) Int. Cl.
   *B60F 5/02* (2006.01)
   *B64C 11/00* (2006.01)
   *B64C 29/00* (2006.01)
   *B64C 37/00* (2006.01)

(52) U.S. Cl.
   CPC .............. *B60F 5/02* (2013.01); *B64C 11/001* (2013.01); *B64C 29/0033* (2013.01); *B64C 37/00* (2013.01)

(58) Field of Classification Search
   CPC ............ B64C 37/00; B60F 5/02; B64U 60/70
   See application file for complete search history.

(56) References Cited

U.S. PATENT DOCUMENTS

| | | | |
|---|---|---|---|
| 2,858,091 A | 10/1958 | Kapenkin | |
| 4,824,053 A | 4/1989 | Sarh | |
| 5,645,250 A | 7/1997 | Gevers | |
| 6,834,835 B1 | 12/2004 | Knowles | |
| 7,762,500 B1 | 7/2010 | Dhall | |
| 7,789,343 B2 | 9/2010 | Sarh | |
| 7,832,690 B1 | 11/2010 | Levine | |
| 7,866,610 B2 | 1/2011 | Bousfield | |
| 7,938,358 B2 | 5/2011 | Deitrich | |
| 8,267,347 B2 | 9/2012 | Goldshteyn | |
| 8,336,830 B2 | 12/2012 | Eberhardt | |
| 9,259,984 B2 | 2/2016 | Brown | |
| D801,856 S | 11/2017 | Zhou | |
| 10,081,424 B2 | 9/2018 | Radu | |
| 11,117,658 B2 | 9/2021 | Neff | |
| 2004/0104303 A1* | 6/2004 | Mao | B64C 37/00 244/12.5 |
| 2006/0016930 A1 | 1/2006 | Pak | |
| 2008/0048065 A1 | 2/2008 | Kuntz | |
| 2011/0042507 A1 | 2/2011 | Seiford, Sr. | |
| 2018/0257448 A1 | 9/2018 | Schreiner | |
| 2018/0354607 A1 | 12/2018 | Marot | |
| 2020/0172234 A1* | 6/2020 | Neff | B64C 37/00 |
| 2021/0229512 A1* | 7/2021 | Opalinski | B60F 5/02 |
| 2023/0115625 A1 | 4/2023 | Myer | |

* cited by examiner

*Primary Examiner* — Ashesh Dangol

(74) *Attorney, Agent, or Firm* — Bullock Law; Stephen Bullock

(57) ABSTRACT

A land to air vehicle with lower extendable wings and upper extendible wings, a body, a front hood fan, a rear fan and wheels. The wheels include wheel bases, exterior tires circumscribing the wheel bases, and a fan wheel assembly within each wheel base. The wheel assembly includes extendible fans, a rotor outer rim with teeth for holding a stator inner rim, a propeller shroud configured to house a variety of fan blades, at least one fan within the propeller shroud, a hinge fixedly attached to the outer rotor rim and the propeller shroud, a wheel motor platform and a wheel motor. The hinge is structured to allow the propeller shroud with fans to extend distally from the wheel base interior to navigate the land to air vehicle.

1 Claim, 7 Drawing Sheets

VERTICAL TAKEOFF AND LANDING PERSONAL LAND TO AIR VEHICLE

FIELD OF THE INVENTION

The present invention relates to vertical takeoff and landing vehicles. In particular, the present invention relates to personal conversionary land to air vertical takeoff and landing vehicles.

BACKGROUND

Personal Land to Air Vehicles have taken many forms throughout the years. However, none have effectively solved how to extend thrusters from within the wheel base. This not only limits the navigational capabilities of the aircraft, but also ends up creating what resembles simply a small aircraft. Therefore, there exists a need in the art for a land to air vehicle that can effectively operate as a land vehicle, but seamlessly transition into an aircraft with multidirectional capabilities that take advantage of the structure of an automobile rather than view it as a limitation. Therefore, there exists a need in the art for an improved land to air personal vehicle as shown and described herein.

SUMMARY OF THE INVENTION

Embodiments of the present invention are related to a land to air vehicle with lower extendable wings and upper extendible wings, a body, a front hood fan, a rear fan and wheels. The wheels include wheel bases, exterior tires circumscribing the wheel bases, and a fan wheel assembly within each wheel base. The wheel assembly includes extendible fans, a rotor outer rim with teeth for holding a stator inner rim, a propeller shroud configured to house a variety of fan blades, at least one fan within the propeller shroud, a hinge fixedly attached to the outer rotor rim and the propeller shroud, a wheel motor platform and a wheel motor. The hinge is structured to allow the propeller shroud with fans to extend distally from the wheel base interior to navigate the land to air vehicle.

DETAILED DESCRIPTION OF THE INVENTION

The present invention will now be described in detail with reference to the accompanying drawings. The embodiment descriptions are illustrative and not intended to be limiting in any way. Other embodiments of the invention will readily suggest themselves to persons with ordinary skill in the art after having the benefit of this disclosure. Accordingly, the following embodiments are set forth without any loss of generality and without imposing limitation upon the claimed invention.

Directional terms such as "above" "below" "upper" "lower" and other like terms are used for the convenience of the reader in reference to the drawings. Additionally, the description may contain terminology to convey position, orientation, and direction without departing from the principles of the present invention. Such positional language should be taken in context of the represented drawings.

Quantitative terms such as "generally" "substantially" "mostly" and other like terms are used to mean that the referred object, characteristic, or quality constitutes a majority of the referenced subject. Likewise, use of the terms such as first and second do not necessarily designate a limitation of quantity. Such terms may be used as a method of describing the presence of at least one of the referenced elements or may provide a means of differentiating orientation. The meaning of any term within this description is dependent upon the context within which it is used, and the meaning may be expressly modified.

Figure 1:
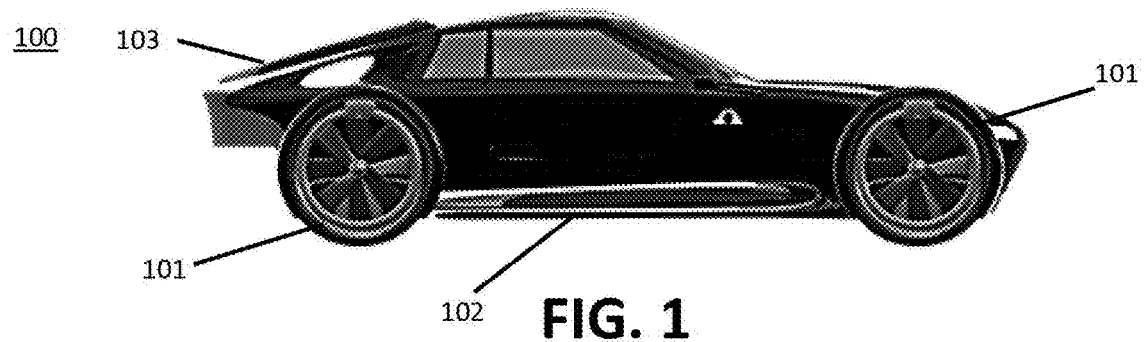
FIG. 1 is a side view of the land to air vertical takeoff and landing vehicle according to an embodiment of the invention.

Referring to FIG. 1, a vertical takeoff and landing (vtol) vehicle 100, hereinafter the vehicle 100, will now be described more fully. In a first embodiment, the vehicle 100 may resemble a traditional land cruising vehicle consisting of a body and wheels. Furthermore, it should be noted that in all embodiments the vehicle 100 may operate on land like a traditional automobile utilizing spinning tires for movement. However, this vehicle 100 may include extendible fan wheels 101, lower extendable wings 102, and upper extendable wings 103 for use in flight.

Figure 2:
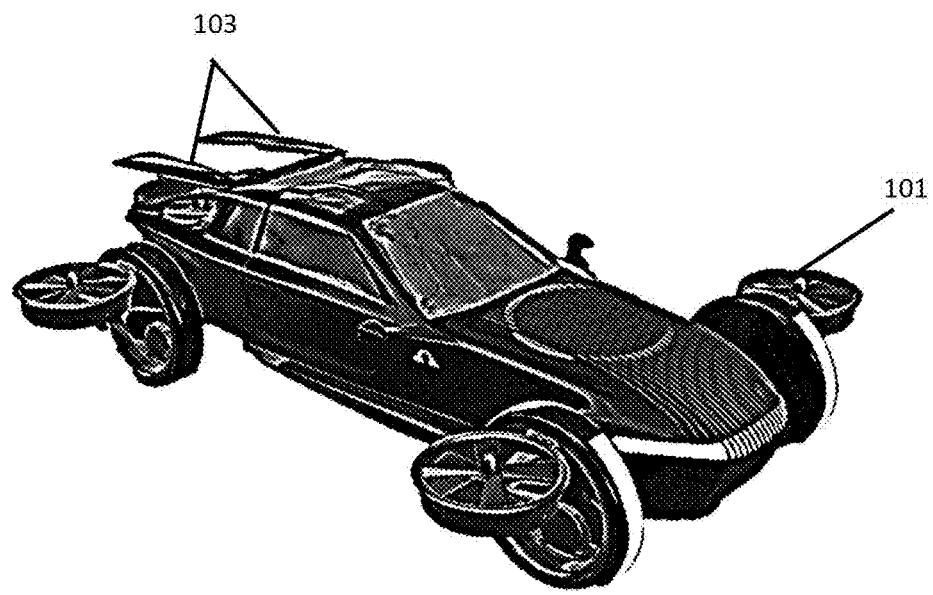
FIG. 2 is a front perspective view of the land to air vertical takeoff and landing vehicle in FIG. 1.

FIG. 2 illustrates the vehicle 100 transitioning between an automobile and a personal aircraft via extendable fans housed within the wheel bases. Furthermore, the upper extendible wings 103 in this figure are orienting in their flight position.

Figure 3:
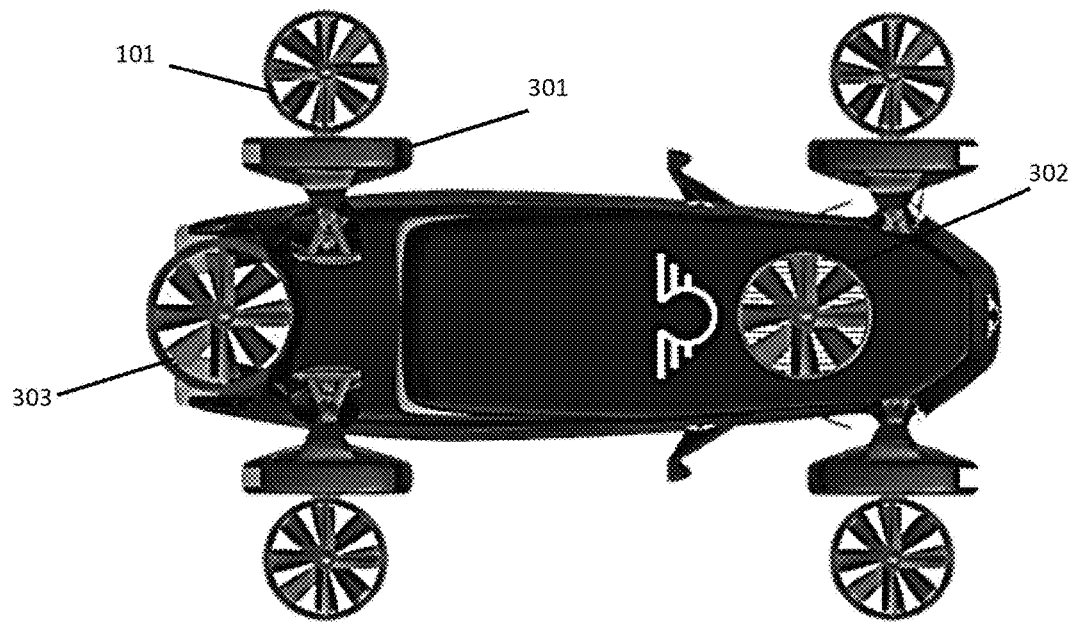
FIG. 3 is a top view of the land to air vertical takeoff and landing vehicle illustrated in FIG. 1.

FIG. 3 is a top-down view of the vehicle 100 illustrating the extendible fan wheels 101 in their fully extended orientation and positioned for vertical takeoff and landing. Further shown are front hood fans 302 and rear fans 303 located atop the vehicle 100.

Figure 4:
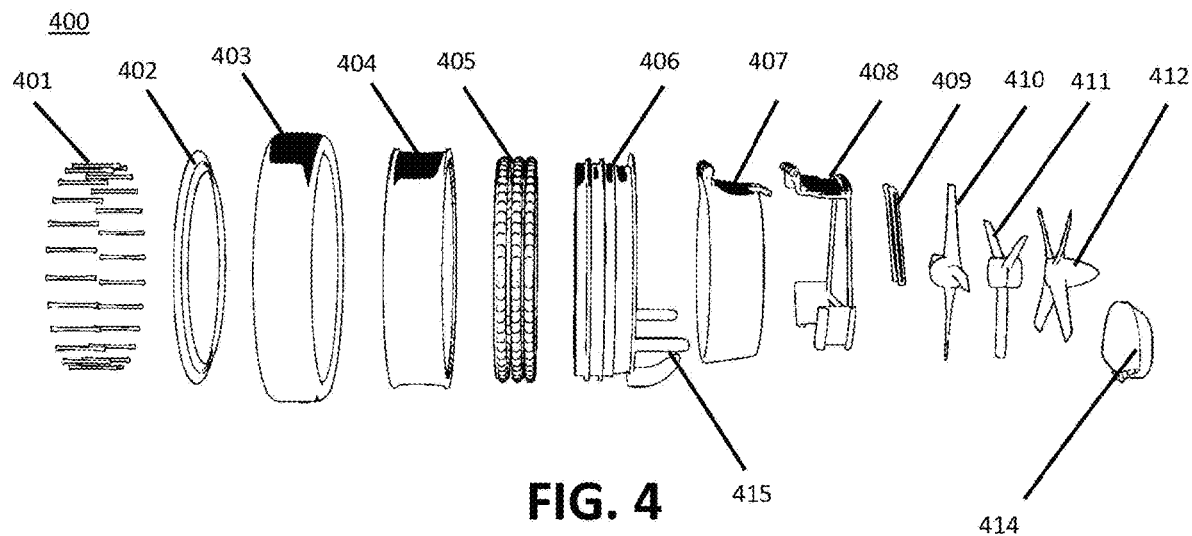
FIG. 4 is an exploded view of a fan wheel assembly according to an embodiment of the invention illustrated in FIG. 1.

FIG. 4 is an exploded view of a typical fan wheel assembly 400 according to an embodiment of the invention. As shown, the fan wheel assembly 400 may include attachment members 401, which in this embodiment may be screws structured to hold the different components of the wheel assembly 400 together around its periphery. The fan wheel assembly 400 may also include a front face plate 402 and tire 403 similar to traditional vehicle wheels. It may also include a rotor outer rim 404 with teeth for holding a stator inner rim 406. There may also be a propeller shroud 407 structured to house a variety of fan blades 410, 411, 412 therein. Also found within the wheel assembly 400 may be a motor platform 415 structured to house a wheel motor 414 thereon.

FIGS. 5A through 5E illustrate the functionality of the fan wheel assembly 400. In particular, these figures illustrate how a fan 502 is affixed via hinge 501 enabling the fan 502 to extend past the tire 403, but still remain within the propeller shroud 407. In this first wheel embodiment, the fan blades 530 may radiate and rotate from and around a wheel center 525. In a second wheel embodiment illustrated by FIGS. 5G and 5H, the fan blades 530 may turn from the rim 505 instead of the center 525.

Figure 5A:
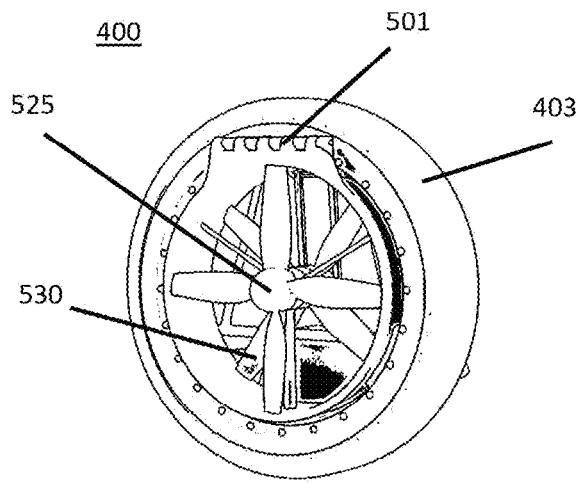
FIG. 5A is a perspective view of a fan wheel according to the embodiment of the invention illustrated in FIG. 1.

FIG. 5A illustrates how the hinge 501 may be oriented in its default position relative to the tire 403. In some embodiments, the hinge 501 may default to a 12 o'clock position relative to the entire fan wheel assembly 400. This default position may allow for the fans 502 to extend outward perpendicularly for vertical takeoff and landing.

Figure 5B:
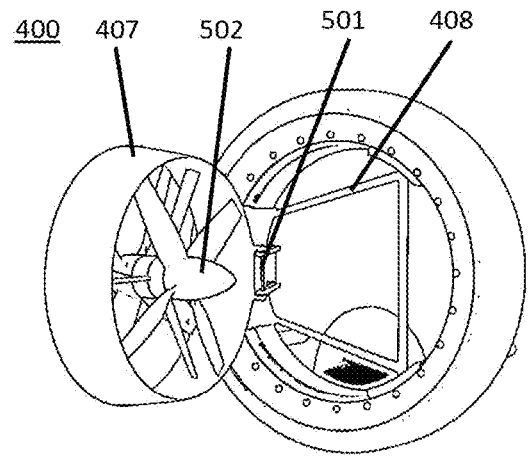
FIG. 5B is a perspective view of a fan wheel according to the embodiment of the invention illustrated in FIG. 1.
Figure 5C:
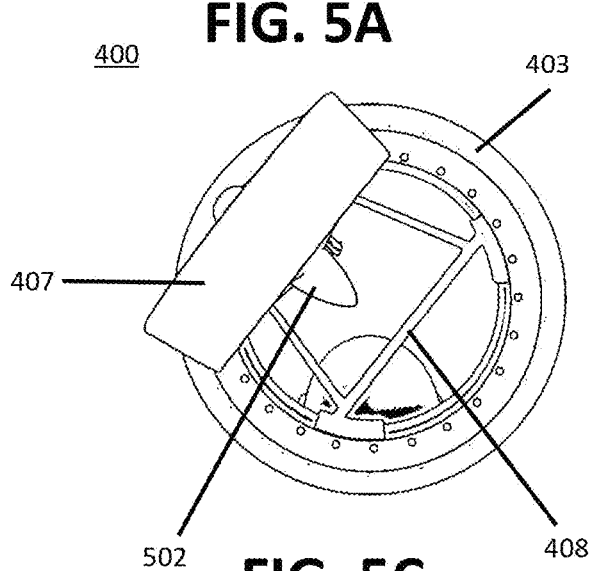
FIG. 5C is a perspective view of a fan wheel according to the embodiment of the invention illustrated in FIG. 1.
Figure 5D:
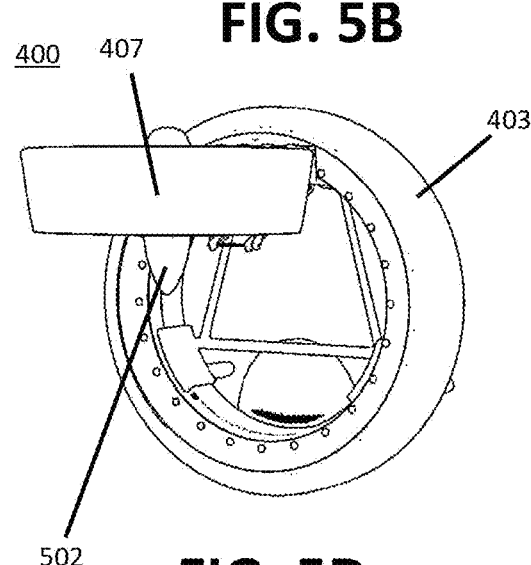
FIG. 5D is a perspective view of a fan wheel according to the embodiment of the invention illustrated in FIG. 1.
Figure 5E:
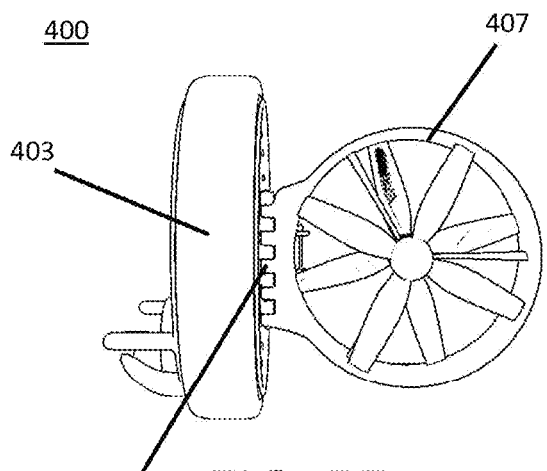
FIG. 5E is a perspective view of a fan wheel according to the embodiment of the invention illustrated in FIG. 1.

As shown by FIG. 5B, the fans 502 may be rotated to a 9 o'clock position in order for the vehicle 100 to be propelled forward. Likewise, FIGS. 5O, 5D, and 5E illustrate that the fans 502 may be rotated circumferentially around the wheel base from a 1 o'clock position to a 9 o'clock position 101 for complete navigation of the vehicle 100.

Figure 5F:
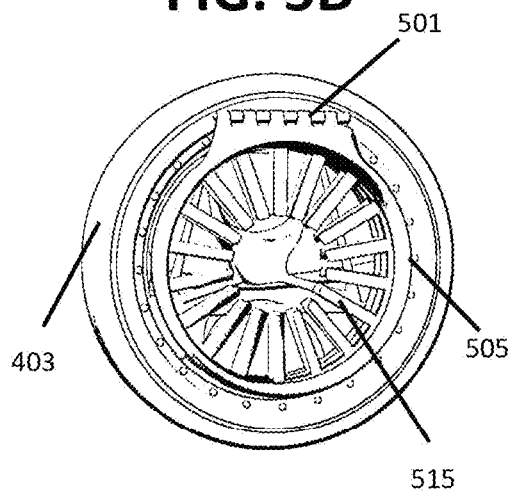
FIG. 5F is a front perspective view of another embodiment of a wheel according to the invention illustrated in FIG. 1.
Figure 5G:
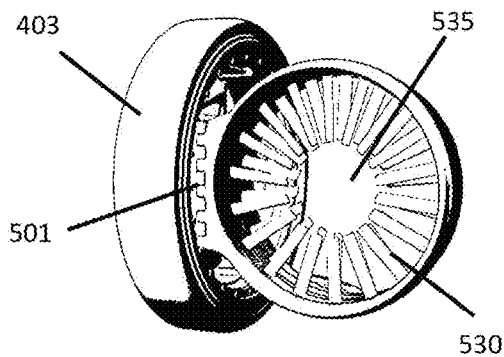
FIG. 5G is a side perspective view of a of another embodiment of a wheel according to the invention illustrated in FIG. 1.

FIGS. 5F and 5G illustrate another wheel embodiment whereby the wheel may include a rim-driven thruster instead of a normal propeller as illustrated in FIGS. 5A through 5E. As shown, this wheel embodiment may be a ducted fan without a center 535. Therefore, the fan blades 530 may turn from the rim 505 instead of the center 525.

Figure 5H:
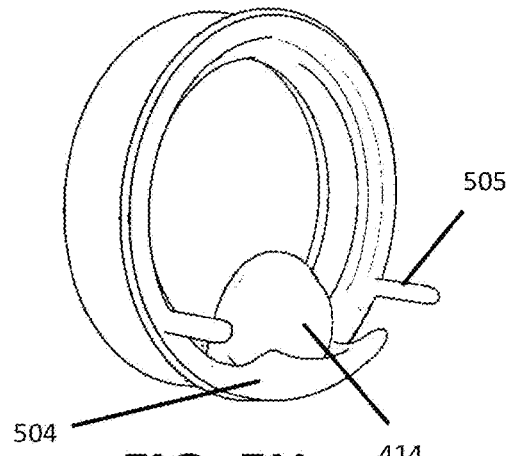
FIG. 5H is a perspective view of a fan wheel base according to the embodiment of the invention illustrated in FIG. 1.

Furthermore, and as shown by FIG. 5H, because each extendable fan wheel 101 includes its own motor 414, each fan 502 may be independently operated and positioned around the wheel circumference as needed for optimal navigation of the vehicle 100. It should be noted that when extended, the fans 502 are always perpendicular to the wheel base even when rotated therearound.

Figure 6:
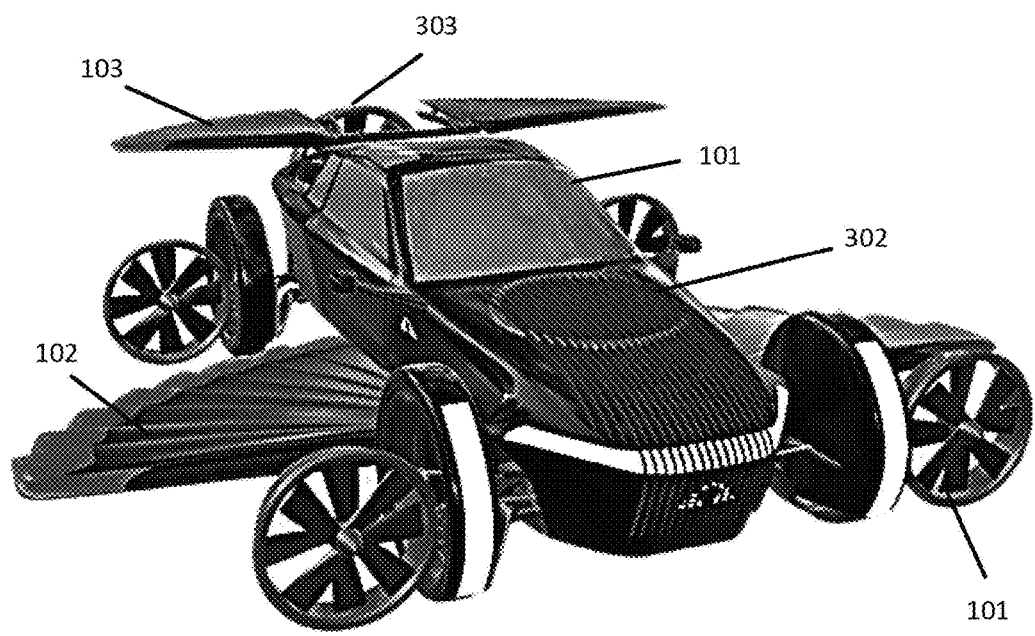
FIG. 6 is a front perspective view of the land to air vertical takeoff and landing vehicle in FIG. 1 with extended componentry.
Figure 7:
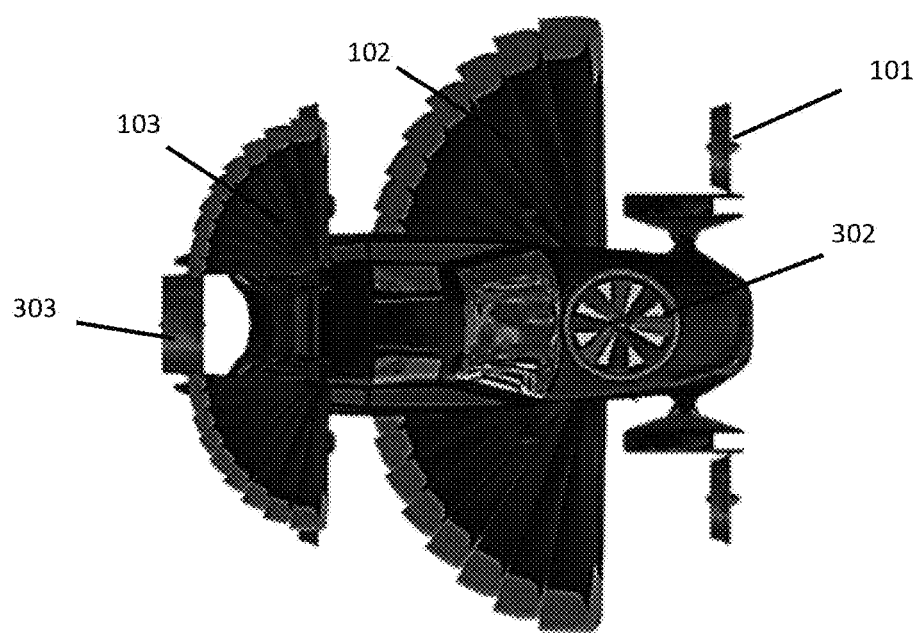
FIG. 7 is a top view of the land to air vertical takeoff and landing vehicle in FIG. 1 with extended componentry.

FIGS. 6 and 7 illustrate the vehicle with extended lower wings 102 and extended upper wings 103 each assisting with stabilizing the vehicle 100 during flight. Furthermore, these figures emphasize the front fan 302 and rear fan 303 that assist with navigation as well. As shown, the rear fan 303 may be rotatable to assist with providing with forward, backward, and rotational navigation of the vehicle 100.

Figures 8A, 8B:
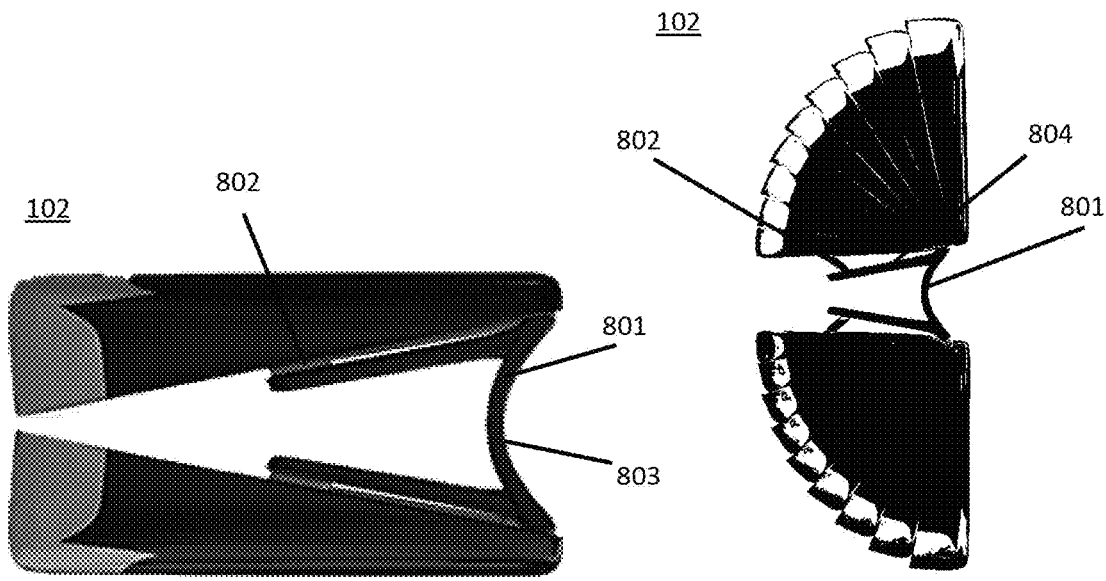
FIG. 8A is top view of an upper wing set of the land to air vertical takeoff and landing vehicle in a closed position.
FIG. 8B is top view of an upper wing set of the land to air vertical takeoff and landing vehicle in an open position.

FIGS. 8A and 8B illustrate the upper wings 102 and their assembly. In particular, there may be a wing brace 801 that may be centrally positioned between each wing. This may include a curved member 803 attaching to each of the wing shoulders, a longitudinal member 804 running longitudinal and slightly angled with respect to each wing interior, and wing attachment members 802 connecting the brace 801 to each respective wing. The wing brace 801 may connect the wings to the vehicle 100.

Figure 9A:
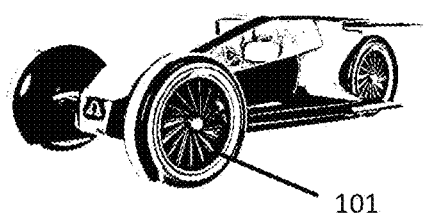
FIG. 9A is a front perspective view of another embodiment of the land to air vertical takeoff and landing vehicle.
Figure 9B:
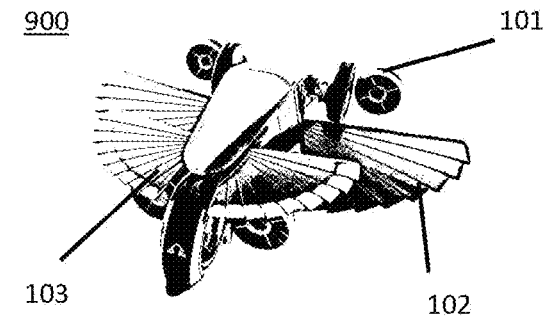
FIG. 9B is a rear perspective view of the land to air vertical takeoff and landing vehicle illustrated in FIG. 9A.
Figure 9C:
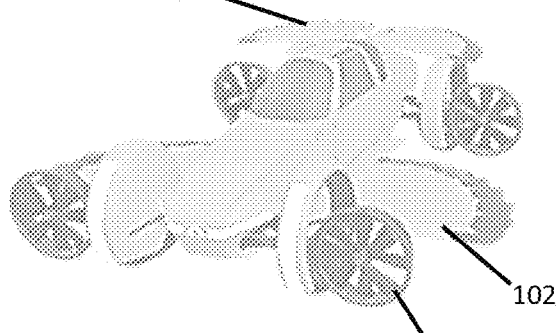
FIG. 9C is a front perspective view of the land to air vertical takeoff and landing vehicle illustrated in FIG. 9A with extended componentry.
Figure 10A:
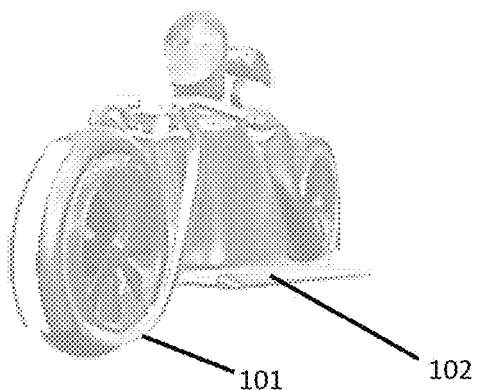
FIG. 10A is a front perspective view of another embodiment of the land to air vertical takeoff and landing vehicle.
Figure 10B:
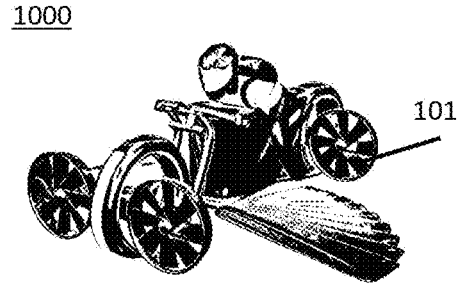
FIG. 10B is a front perspective view of the land to air vertical takeoff and landing vehicle illustrated in FIG. 10A with extended componentry.
Figure 10C:
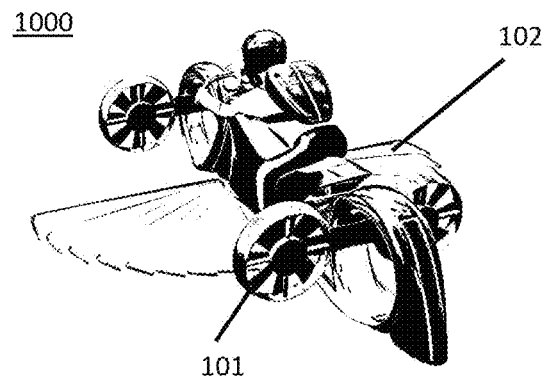
FIG. 10C is a rear perspective view of the land to air vertical takeoff and landing vehicle illustrated in FIG. 10A with extended componentry.
Figure 10D:
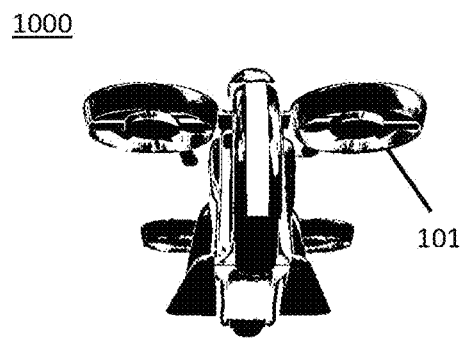
FIG. 10D is a bottom perspective view of the land to air vertical takeoff and landing vehicle illustrated in FIG. 10A with extended componentry.

FIGS. 9A, 9B, and 9C illustrate another embodiment of the vehicle 900 whereby the front fan 302 has been removed for a more compact design. In this embodiment there may be two front extendible fan wheels 101 and a single rear extendible fan wheel 101. However, the rear extendible fan wheel 101 may include fans 502 on both its sides to stabilize the rear of the vehicle 900 in flight. Like the other embodiments, this design may also include lower extendible wings 102 and upper extendible wings 103.

FIGS. 10A, 10B, 10C, and 10D illustrate another embodiment of the vehicle 1000 with a motorcycle design. With this design, the vehicle 1000 includes a front extendible fan wheel 101 and a rear extendible fan wheel 101. Both the front and back extendible fan wheels 101 include fans 501 that extend from both sides. Furthermore, like the other extendible fan wheels 101, the fans 501 are fully rotatable 360 degrees around the wheel base in order to provide navigation of the vehicle 1000 in flight. Additionally, and similar to the other vehicles, the motorcycle may include a set of lower extendible wings 102 to assist with stabilizing the vehicle 1000 during flight.

That which is claimed is:

1. A land to air vehicle comprising:
lower extendable wings and upper extendible wings;
a body;
a front hood fan and a rear fan;
wheels comprising:
   wheel bases,
   exterior tires circumscribing the wheel bases,
   a fan wheel assembly within each wheel base comprising:
      an extendible wheel fan, comprising a propeller shroud configured to house at least one set of fan blades wherein each set of fan blades defines a propeller housed within each wheel base
      a rotor outer rim with teeth for holding an inner stator rim,
      the propeller shroud configured to house at least one propeller,
      a hinge fixedly attached to the outer rotor rim and the propeller shroud,
      a wheel motor platform and wheel motor,
   wherein the hinge is configured to allow the propeller shroud with the at least one propeller to extend distally from an interior of the wheel base to navigate the land to air vehicle.

* * * * *